Jan. 18, 1955 D. KLEIS ET AL 2,700,073

HEAD OF EQUIPMENT FOR MAGNETIC RECORDING AND REPRODUCTION

Filed April 30, 1952 3 Sheets-Sheet 1

INVENTORS.
Derk Kleis
Willem Klaas Westmijze
Hermanus Stefanus Fuchs
BY
AGENT

INVENTORS
Derk Kleis
Willem Klaas Westmijze
Hermanus Stefanus Fuchs
BY Fred M Vogel
AGENT

HEAD OF EQUIPMENT FOR MAGNETIC RECORDING AND REPRODUCTION

Filed April 30, 1952 3 Sheets-Sheet 3

INVENTORS
Derk Kleis
Willem Klaas Westmijze
Hermanus Stefanus Fuchs
BY [signature]
AGENT 2,700,073

HEAD OF EQUIPMENT FOR MAGNETIC RECORDING AND REPRODUCTION

Derk Kleis, Willem Klaas Westmijze, and Hermanus Stefanus Fuchs, Eindhoven, Netherlands, assignors to Hartford National Bank and Trust Company, Hartford, Conn., as trustee Application April 30, 1952, Serial No. 285,288

Claims priority, application Netherlands May 10, 1951

6 Claims. (Cl. 179—100.2)

The invention relates to magnetic recording or reproducing heads of the kind comprising at least one magnetic circuit which incorporates two rigid bodies assembled so that the circuit is mechanically interrupted at two areas, the main direction of magnetic flux in each of the circuit portions constituted by one of the rigid bodies lying at least substantially in a flat plane and the end surfaces of each said portion facing the interruption areas lying in a common flat plane. This known construction is usually adapted to simplify the arrangement of the energizing coil or coils of the circuit, since it is thus possible to use preformed coils, for example, coils wound on a jig. A further simplification is obtained if the aforesaid portions of the circuit are both shaped in the form of symmetrical, U-shaped halves, so that the components are readily interchangeable and the record-carrier may be arranged to pass along either of the interruption areas as desired. The provision of an effective interruption area may be rendered easier and cheaper inter-alia by simultaneously working the end surfaces of each of the circuit portions.

Because of the high iron losses which may occur during operation, each rigid portion of the magnetic circuit is frequently built up from laminations, so that a flat or substantially flat shape of the circuit portions is obtained. If non-laminated circuits are required compacts of pulverulent, magnetisable material may be used.

The rigid circuit portions are pressed towards one another in a direction at least substantially at right angles to the said end surfaces in a manner such that the common flat planes in which the end surfaces are located are parallel to one another. As is known, it is possible to obtain in this manner a simple and readily assembled construction. The end surfaces of the circuit portions may be in direct physical contact with one another, so that an extremely narrow air gap is formed, or they may be in contact with a spacing plate of non-magnetic material, which is ground to the desired thickness. For the sake of simplicity the space between the end surfaces thus provided in either case will, hereinafter, be referred to as the "air gap."

With a known construction of head of this kind the magnetic circuit is, moreover, clamped tightly between dish-shaped pressure plates, which are ground flat in a direction transverse to the first-mentioned direction, by means of a detachable connection, for example, one or more bolts. The unit thus formed is secured, preferably in an adjustable manner, to a mounting plate or the like. However, we have found that, even if the component parts are machined very accurately, it is practically impossible to arrange for the end surfaces of the rigid circuit portions to be accurately at right angles to the plane in which the main direction of the flux is located. This is a prime requirement particularly with the small size of air gap used nowadays, since a small divergence from the parallel position of the end surfaces exerts a comparatively large influence on the magnetic effectiveness of the air gap. For example, if the end surfaces are at an angle of not more than 3 minutes to one another and the pole-shoe width is 7 mm., a maximum divergence of 7 $\mu$ will occur between these end surfaces, which is inadmissible for an air gap of the order of 10 $\mu$.

In spite of the fact that the end surfaces are urged towards one another, this divergence will occur with the said known construction comprising pressure-plates, which have to provide for mechanical unity of the circuit portions, the laminations being thereby tightly pressed together.

With the head according to the invention any one plane of one circuit portion which defines the location of the main direction of the flux is at an angle deviating from 180° with respect to the corresponding plane of the other circuit portion and the circuit portions are held in place relative to one another in the pressed condition. When machining the parts of the head it is now only necessary to provide that the end surfaces of each circuit portion are ground so as to be accurately flat and are located in a common flat plane; this may be achieved in one grinding operation. Since the two circuit portions are urged towards one another in a direction transverse to the end surfaces, the end surfaces of the two circuit portions are in excellent contact with one another and the relative fixation of the circuit portions provides the required position of the end surfaces. The rigid circuit portions may be made from laminated or non-laminated, magnetisable material. The rigidity guarantees that the pressure forces exerted will not deform the circuit portions themselves, so that undesirable complications in assembling are avoided.

It will be obvious that with the simple machining required according to the invention, with which, for example if laminations are used, it is not necessary to grind the parts accurately at right angles, the aforesaid deviation from 180° of the angle between the planes defining the main direction of the lines of force of each circuit portion will be comparatively small.

In order to fix the relative positions of the circuit portions one of the portions is conveniently secured to a supporting body whereas the other is urged against the first by means of a detachable connection, for example, a spring. Since only one of the circuit portions is then in contact with the supporting body, it is not possible for contact with the supporting body by the other circuit portion to disturb the correct relative positions of the end surfaces.

In a further embodiment each of the circuit portions is urged locally against a supporting surface with an outer surface located at the side of the plane including the main direction of the lines of force, the supporting surfaces forming one mechanical supporting body. Since the contact of each of the circuit portions with the associated supporting surface is only local, adequate adjustability of the circuit portions is maintained to ensure the correct position of the end surfaces thereof. It is evident that the area where the pressure is applied to each of the circuit portions must be chosen relative to the contact area of the circuit portion and the associated supporting surface to ensure that no moment is produced tending to vary the relative positions of the portions, which are determined by the pressure forces directed transversely to the end surfaces.

The means urging the circuit portions towards one another are preferably secured to the supporting body. Thus certain fixation of the relative positions of the portions is provided.

We may use a device by means of which both the pressure forces for the fixation of the circuit portions and the pressure forces urging the portions towards one another are obtained in a simple manner. For this purpose the circuit portions may be urged against one another with the use of a U-shaped blade spring whose ends are secured to the supporting body, the circuit portions being clamped between its limbs, the connecting piece between the limbs being curved towards the supporting body, and a clamping piece being provided between this connecting piece and the circuit portions to urge the portions against the supporting surfaces of the supporting body. Thus a simple detachable connection of the component parts is obtained. The construction described permits of obtaining a head, the magnetic operation of which fulfils the highest requirements with respect to quality in recording or reproducing, this construction providing nevertheless a simple and cheap product owing to the choice of the connecting means and to the minimum requirements with respect to accurate working.

The invention furthermore relates to a head comprising at least two magnetic circuits each having two interruption areas, these circuits being arranged in the proximity of one another at the position of the air gaps along which the record-carrier is passed and the end surfaces of the corresponding circuit portions being located in a common flat plane. Such heads may, for example, be used for stereophonic sound recording or reproduction. In order to economize in carrier material as much as possible, it is desirable to arrange the air gaps of each circuit, along which the carrier is passed, to be as near to one another as is possible in connection with the magnetisation of the carrier in two or more tracks; however, this nearness has been limited to a certain extent hitherto owing to the presence of the energizing coils of the circuits. Particularly with the said stereophonic use, the corresponding end surfaces of the said interruption areas must be arranged extremely accurately, in order to avoid the introduction of undesirable phase differences between the magnetic tracks. In order to fulfill the first-mentioned condition, various solutions have been proposed for the problem of arranging the energizing coils but these solutions are not attractive, since they require additional mechanical working of the components, for example, the bending of parts of the magnetic circuit out of one plane or the use of differently shaped circuit portions, arranged in a particular manner. In order to meet the last-mentioned condition it has been suggested to render the corresponding circuit portions, on the same side of the air gaps, integral with one another, for example, by means of bolts or clamping holders, at least in the proximity of the air gap along which the carrier is passed and to work the corresponding end surfaces in a common mechanical operation.

With the head according to the invention, the aforesaid requirements are fulfilled in a very simple manner with minimum cost, since the flux-defining planes of the circuit portions of at least one circuit are at an angle deviating from 180° with respect to one another and since, by suitable choice of the value of the deviation, sufficient space is rendered available between the circuit portions of at least one of the two sets of corresponding parts of adjacent circuits to house the energizing coils.

In certain cases it may be advantageous, in order to fix the relative positions of the aforesaid portions, for the circuit of the head, after the energizing coils have been arranged in position, to be surrounded with the exception of at least one of the air gaps, i. e. that with which the carrier must cooperate, wholly or in part by non-magnetic material, which is provided in the liquid state and then hardened, for example, by solidification or drying, so that the portions of the circuit are rendered integral with one another.

In order that the invention may be more clearly understood and readily carried into effect, several embodiments thereof will now be described more fully with reference to the accompanying drawing, in which.

Figures 4, 5:
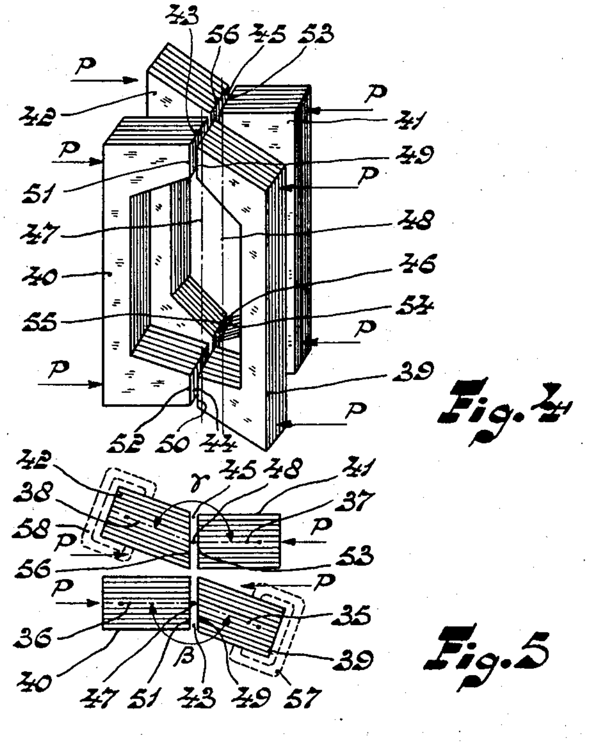
Fig. 4 is an oblique projection of the magnetic circuits of a stereophonic head according to the invention.
Fig. 5 is a plan view of the circuits shown in Fig. 4.

Figs. 6*a* to 6*d* show a few of the possible alternatives for the circuits comprised in the stereophonic head shown in Fig. 4.

Figures 7, 8, 9, 10:
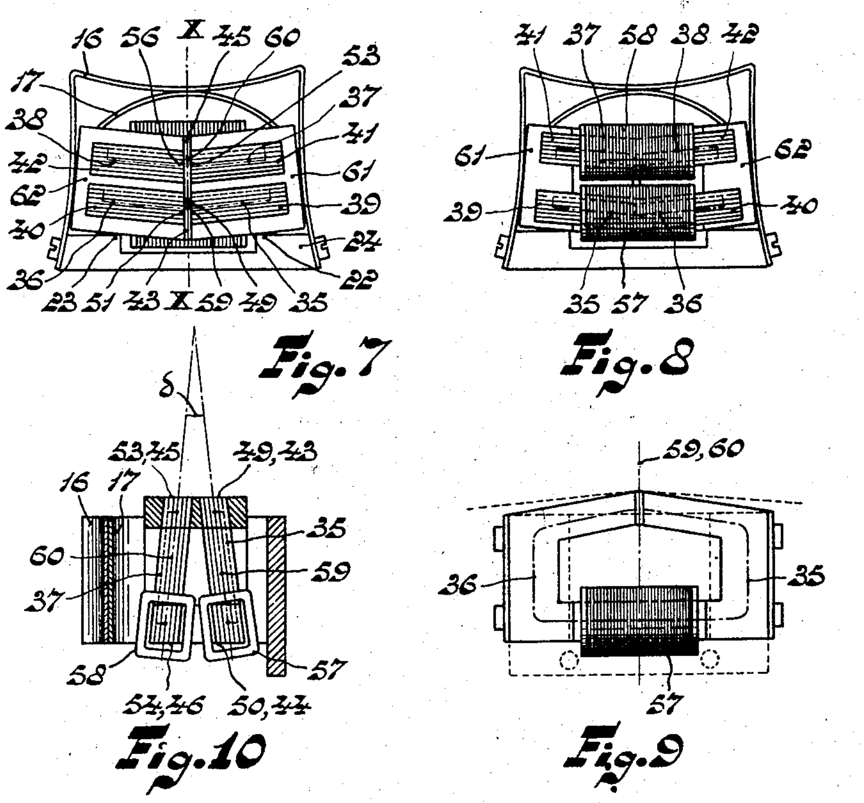

Figs. 7, 8 and 9 are a plan view, a bottom view and a side view respectively of a further embodiment of a stereophonic head according to the invention and Fig. 10 is a cross-sectional view taken on the line X—X of the head shown in Fig. 7.

Figure 1:
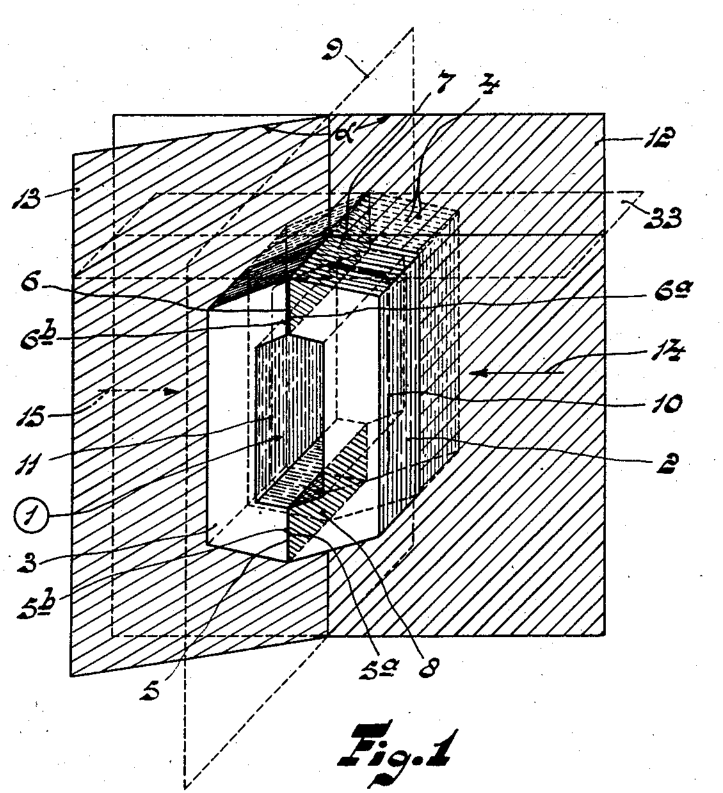
Fig. 1 is an outline of the magnetic circuit of one head according to the invention.

Referring to Fig. 1, the magnetic circuit of one form of head according to the invention is designated generally 1. The circuit comprises two U-shaped portions, constituted by rigid bodies 2 and 3, built up from flat laminations 4. The laminations of each circuit portion are held together with the aid of bolts, clamps or an adhesive. The circuit is mechanically interrupted at 5 and 6 respectively and the end surfaces **5*a*, 6*a* and 5*b*, 6*b* respectively of each circuit portion facing the air gap are located in a common flat plane, since the corresponding end surfaces are machined accurately in one mechanical operation. The common flat planes, which are parallel to one another and spaced apart by a very small distance, determined by the thickness of non-magnetic spacing plates 7 and 8 respectively, are shown in the figure by a single flat plane 9 for the sake of simplicity. The main direction of the path of the lines of force in the circuit portions 2 and 3 is designated by 10 and 11 respectively; these lines being located at least substantially in the flat planes 12 and 13 respectively and parallel planes. In accordance with the invention the plane 12 defining direction 10 is at an angle $\alpha$ deviating slightly from 180° with respect to the plane 13 defining direction 11** corresponding thereto.

The outer surfaces of the circuit portions 2 and 3 located on the front side and on the rear side, as shown in the figure, form planes which are located at the side of, in this case parallel to the planes 12 and 13 respectively. The circuit portions 2 and 3 are urged towards one another in the directions indicated by the arrows 14 and 15, substantially at right angles to the plane 9. Since the spacing plates 7 and 8 are perfectly similar in thickness and since the end surfaces **5*a*, 6*a* and 5*b*, 6*b*** are ground to be perfectly flat, the end surfaces are accurately parallel in the pressed position of the portions. The circuit portions are fixed in place in this position. If, for this purpose, efforts were to be made to machine the end surfaces of each of the circuit portions in a manner such that they are at right angles to the side surfaces of the circuit portions, after which the said side surfaces of the portions were to be urged against one another with great force between two pressure dishes which are ground so as to be flat, as is common practice with heads, particularly with laminated heads, it is substantially unavoidable that the end surfaces are displaced relatively to one another through a small angle. This is due to the fact that it is not possible in practice to provide accurate right angles between the said side surfaces and the end surfaces of the portions with the precision required.

Figure 2:
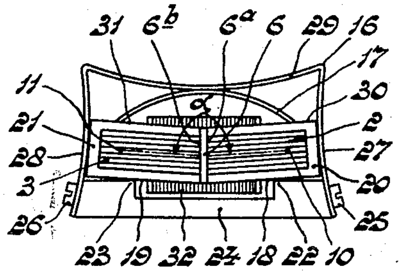
Figs. 2 and 3 are a plan view and a side view respectively of a head according to the invention.
Figure 3:
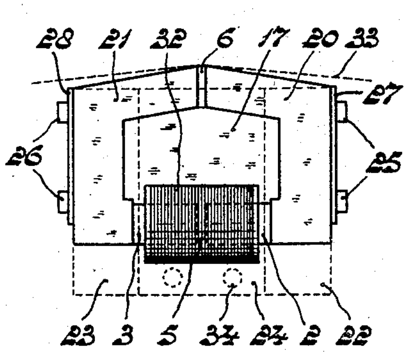

Referring to Figs. 2 and 3, this difficulty is solved by fixing the correct positions of the end surfaces by the pressure provided by a spring 16 in conjunction with a clamping piece 17, which may also be resilient. With the use of the spring the appropriate surfaces of the circuit portions located on the front side, in the embodiment shown the side surfaces 18 and 19 of holders 20 and 21 of non-magnetic material, which partly grip the packets of laminations 2 and 3, are urged only locally at 22 and 23 respectively against a supporting surface. The supporting surfaces form a single supporting body 24. The spring 16 is a U-shaped blade spring, the ends of which are secured to the supporting body 24 by means of screws 25 and 26 respectively and between the limbs 27 and 28 of which the circuit portions are clamped by means of the holders 20 and 21 respectively. The connecting piece 29 between the limbs is curved towards the supporting body 24 and exerts a pressure on the clamping piece 17, which in turn exerts pressure on the side surfaces 30 and 31 of the holders 20 and 21 each at an area which is substantially located opposite the contact areas 22 and 23 of the holders.

The moment which is exerted by the clamping piece 17 on each of the portions and which tends to vary the positions of the circuit portions to be fixed (and hence the angle $\alpha$) is made so small that the relative positions of the portions are maintained. As is best shown in Fig. 3, the energizing coil 32 is located at the position of the air gap 5 and in order to obtain a good contact with the record carrier 33, which is shown in Figs. 1 and 3 in broken lines, the circuit portions are slightly rounded at the position of the air gap 6. The supporting body 24, which is shown in Fig. 3 only by broken lines for the sake of clearness, is provided with a few bores 34 to permit the head to be secured to the chassis of the recording equipment, preferably so as to be adjustable.

Figure 6:
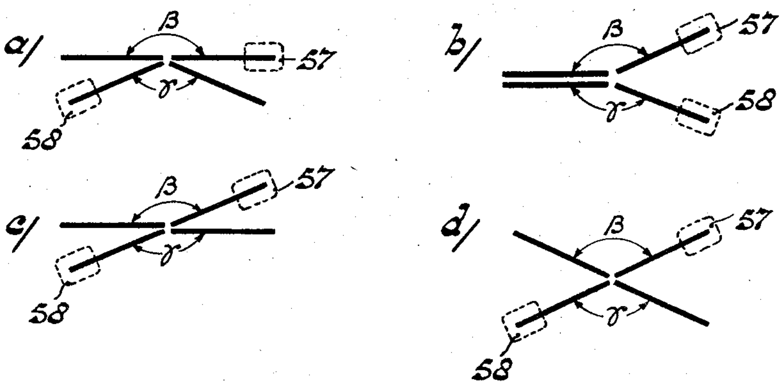

Figs. 4, 5 and 6 show diagrammatically a stereophonic head according to the invention, comprising two magnetic circuits. The main directions of the corresponding lines of force 35, 36 and 37, 38 in the portions 39 and 40 of one circuit and 41, 42 of the other circuit respectively are at angles $\beta$ and $\gamma$ respectively to one another. These angles may be equal to one another but both deviate from 180° by a few degrees or tens of degrees. At the air gaps 43 and 45, along which the record-carrier is passed, the circuits are arranged near to one another in a manner such that the lines of intersection 47 and 48 respectively (indicated in Fig. 4 by dash-and-dot lines) of the planes formed by the main directions of the lines of force 35, 36 and 37, 38 respectively are substantially parallel to one another. The end surfaces 49, 50, 53, 54 and 51, 52, 55 and 56 of the corresponding circuit portions 39, 41 and 40, 42 respectively lie in common flat planes, which are parallel to one another. Owing to the small distance between the two air gaps 43, 45 to be brought into contact with the record carrier the arrangement of the two circuits in the positions described would cause the aforesaid difficulties in the absence of the invention. With the invention suitable choice of the value of the angles $\beta$ and $\gamma$ provides sufficient space to arrange the energizing coils 57 and 58 respectively (shown in broken lines) between the circuit portions 39 and 41 of one set of corresponding parts of the two circuits, and the parts 40, 42 of the other set. Similarly to the head described with reference to Figs. 2 and 3, in view of the position of the coils, proper choice must be made of the areas at which the pressures P, by which the circuit portions are urged towards one another with their end surfaces, are applied.

Figs. 6*a* to 6*d* show different possible arrangements of the circuit portions in diagrammatic plan views; Fig. 6*c* corresponds with Fig. 5. The positions of the energizing coils 57 and 58 are indicated by broken lines.

Finally, Figs. 7 to 10 show a further form of stereophonic head according to the invention; the parts corresponding with those shown in the foregoing figures have the same reference numerals. With a view to economy in record-carrier material, the two circuits 39, 40 and 41, 42 are arranged near to one another, at the air gaps 43 and 45, along which the carrier is passed, similarly to the arrangement shown in Figs. 4 and 5. The end surfaces 49, 50, 53, 54 and 51, 52, 55, 56 of the corresponding circuit portions again lie in a common plane, but in this case in a manner such that the lines of intersection 59 and 60 respectively of the planes defining the main directions of the lines of force 35, 36 and 37, 38 respectively in each circuit portion (these lines being at an angle deviating slightly from 180° with respect to one another as before) are at an angle $\delta$ to one another. In this case the air gaps 44 and 46 (Fig. 10) are spaced further apart than the air gaps 43 and 45, so that the energizing coils 57 and 58 may readily be arranged at the position of the air gaps 44 and 46.

What we claim is:

1. A magnetic recording head comprising a magnetic circuit including at least two rigid members assembled so that said magnetic circuit is mechanically interrupted at two areas, the main direction of magnetic flux in each of said rigid members being in a substantially flat plane, end surfaces of each of said rigid members facing each of said areas and lying in a common flat plane, means urging said rigid bodies toward each other in a direction substantially at right angles to said end surfaces thereby causing said common flat planes to be parallel to one another, and means holding said rigid bodies in a predetermined positional relationship relative to one another whereby the plane in the direction of the magnetic flux of one of said rigid bodies and the plane in the direction of the magnetic flux of the other of said rigid bodies together form an angle of less than 180°.

2. A magnetic recording head as set forth in claim 1 wherein said means urging said members toward each other includes a detachable spring.

3. A magnetic recording head as set forth in claim 1 and further comprising a support, and each of said rigid members having one surface urged against said support.

4. A magnetic recording head as set forth in claim 1 and further comprising a support, and said means which urge said rigid members toward each other being secured to said support.

5. A magnetic recording head comprising a magnetic circuit including at least two rigid members assembled so that said magnetic circuit is mechanically interrupted at two areas, the main direction of magnetic flux in each of said rigid members being in a substantially flat plane, end surfaces of each of said rigid members facing each of said areas and lying in a common flat plane, means urging said rigid bodies toward each other in a direction substantially at right angles to said end surfaces thereby causing said common flat planes to be parallel to one another, means holding said rigid bodies in a predetermined positional relationship relative to one another whereby the plane in the direction of the magnetic flux of one of said rigid bodies and the plane in the direction of the magnetic flux of the other of said rigid bodies together form an angle of less than 180°, a support, a U-shaped spring having its ends secured to said support and enclosing said rigid members therebetween, the bight portion of said U-shaped member being curved in a direction toward said support, and a clamping piece between said spring and said rigid bodies urging said rigid bodies against said support.

6. A magnetic recording head being provided with an energizing coil and comprising at least two magnetic circuits, each including at least two rigid members assembled so that each of said magnetic circuits is mechanically interrupted at two areas, the two magnetic circuits being in juxtaposed relationship to each other, the main direction of magnetic flux in each of said rigid members being in a substantially flat plane, the end surfaces of each of said rigid members being located in a common flat plane, and the plane in the direction of the magnetic flux of one of said rigid bodies and the plane in the direction of the magnetic flux of another of said rigid bodies together form an angle of less than 180°, the angle being chosen to provide sufficient space for the arrangement of each of said energizing coils of each circuit on one of said rigid members.

References Cited in the file of this patent

UNITED STATES PATENTS 2,523,576 Kornei ______________ Sept. 26, 1950